No. 614,371. Patented Nov. 15, 1898.
J. W. DALY.
TRUCK.
(Application filed Aug. 4, 1898.)
(No Model.)

Witnesses
Geo. E. Fuch.
Finis D. Morris.

Inventor
J. W. Daly
by A. S. Pattison
Attorney

UNITED STATES PATENT OFFICE.

JAMES W. DALY, OF NEAR KINSTON, NORTH CAROLINA.

TRUCK.

SPECIFICATION forming part of Letters Patent No. 614,371, dated November 15, 1898.

Application filed August 4, 1898. Serial No. 687,718. (No model.)

*To all whom it may concern:*

Be it known that I, JAMES W. DALY, a citizen of the United States, residing near Kinston, in the county of Lenoir and State of North Carolina, have invented new and useful Improvements in Trucks, of which the following is a specification.

My invention relates to improvements in trucks, and is especially intended to be used for hauling green tobacco and like material.

The object of my invention is to provide a simple and cheap truck constructed with fabric sides, whereby it is light and cheap, and also constructed with a forward reach adapted to be detachably connected to the axle of the draft-wheels, whereby when a load has been carried to the desired point they may be detached and connected with another truck.

Figure 1:
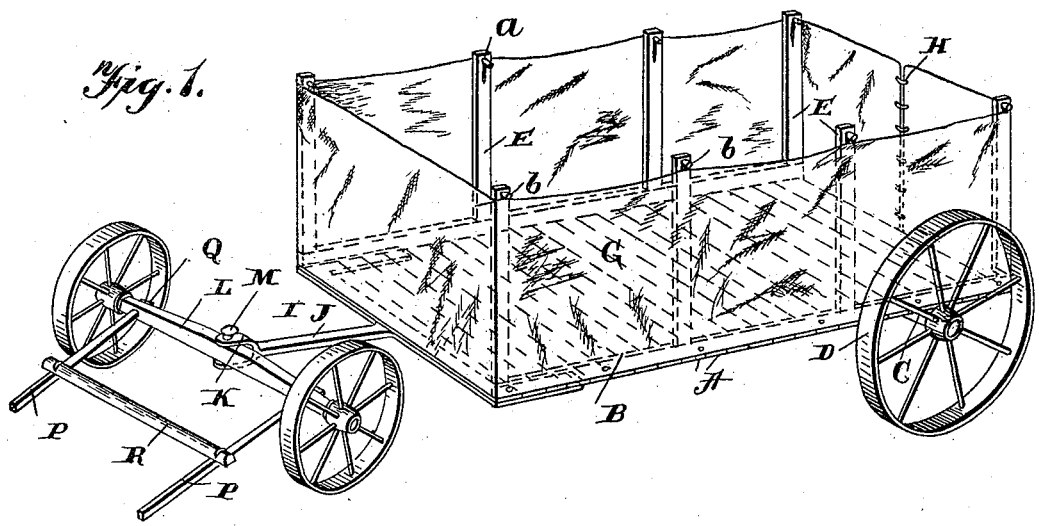
Figure 2:
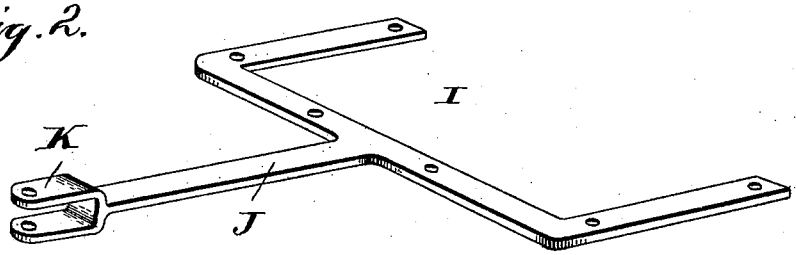

In the accompanying drawings, Figure 1 is a perspective view of a truck embodying my invention. Fig. 2 is a detached view of the forward reach.

Referring now to the drawings, A indicates the bottom of the truck, composed of transverse pieces attached at their ends to the longitudinal beams or bars B. A rear axle C extends across under the truck at a point inside of its rear end and carries the supporting-wheels D.

Projecting from the side bars B are a plurality of standards E, having in their upper ends the transverse openings $a$.

The sides of the truck are composed of a fabric G, of duck or bagging, which has its lower edge at the sides and front tacked to the side pieces B and to the front edge of the bottom A. The upper edge of this fabric is provided with a plurality of cords, one for each standard, and the cords are passed through the openings $a$, formed in the upper ends of said standards and securely held in place by means of detachable pins $b$. By means of this construction the fabric can be raised or lowered, as may be desired, and may be detached at its upper ends and folded inward upon the bottom of the truck when circumstances may require. The fabric is made of a length sufficient to reach along the sides and front end of the bottom and to meet at the center of the rear end, where it is tied, as illustrated at H. This construction makes a very light truck and one in which the sides can be raised and lowered as desired and is especially adapted for hauling green tobacco, fodder, and similar materials.

The forward end of the truck is provided with a reach I, which is U-shaped at its rear end and attached to the forward end of the truck, and this U-shaped portion is provided with a forwardly-extending arm J, having its forward end bifurcated, as shown at K, to span the front axle L, a pin-bolt M passing through the forward ends of the arm J and the axle, as clearly shown.

The shafts P have their rear ends passing through openings in the axle L and clamped in position by bolts Q, the shafts provided with a separating-bar R near their rear ends for holding them in their proper position.

It will be noted from this description that the front wheels are supported forward of the front end of the truck a distance equal to or greater than half the diameter of the wheels, whereby the truck can be turned in a very small space by the turning of the wheels almost at right angles to the truck. Also the front wheels may be detached, and in practice preferably a number of bodies are provided, in connection with which one pair of front wheels are used, whereby when the truck has been drawn from the field to the desired point the front wheels are detached and connected with another truck, which is also loaded. This arrangement is a great saving of time and labor, and is found, especially in the harvesting of tobacco, to be exceedingly desirable.

Having thus described my invention, what I claim, and desire to secure by Letters Patent, is—

1. A truck comprising a bottom having a plurality of projecting standards, a textile side attached at its lower edge to the said bottom and provided with connecting members at its upper edge for attaching it to the upper ends of the standards, substantially as described.

2. A truck comprising a bottom having a plurality of vertical standards, a textile side connected at its lower edge to the bottom, and at its upper edge to the upper end of the standards, substantially as described.

3. A truck comprising a bottom having a plurality of vertical standards with openings in their upper ends, a textile side connected at its lower edge to the bottom and provided at its upper edge with a cord for each standard, the cord being passed through the said openings and attached to the said standards, substantially as described.

4. A truck comprising a bottom having a plurality of vertical standards with openings in their upper ends, a textile side attached at its lower edge to the bottom and provided at its upper edge with a cord for each standard, the cords passing through said openings, and detachable pins passing through the openings for holding the cords against movement and permitting the upper edge of the fabric to be raised and lowered as desired, substantially as described.

5. A truck comprising a bottom having a plurality of vertical standards, a textile side attached at its lower edge to the said bottom and having at its upper edge means for connecting it to the upper ends of the standards, the said fabric extending around the front end and sides of the bottom and meeting at the center of the rear edge, the rear meeting edges of the fabric provided with a tying or attaching means, substantially as described.

6. A truck comprising a body having supporting-wheels for its rear end, a draft-axle and wheels, a forward reach having a U-shaped rear end attached to the bottom of the said body, the U-shaped rear end having a central forward-projecting arm with a bifurcated end adapted to span the said draft-axle, and a pin-bolt passing through the said bifurcated end and the axle, substantially as and for the purpose described.

In testimony whereof I have hereunto set my hand in the presence of two subscribing witnesses.

JAMES W. DALY.

Witnesses:
B. L. TAYLOR,
E. A. SIMKINS.